F. RICCIARDELLI.
PERCOLATOR.
APPLICATION FILED JAN. 17, 1914.

1,121,399.

Patented Dec. 15, 1914.

2 SHEETS—SHEET 1.

Witnesses:
C. W. Benjamin
Nora A. Norton

Inventor
Fiore Ricciardelli
By his Attorney

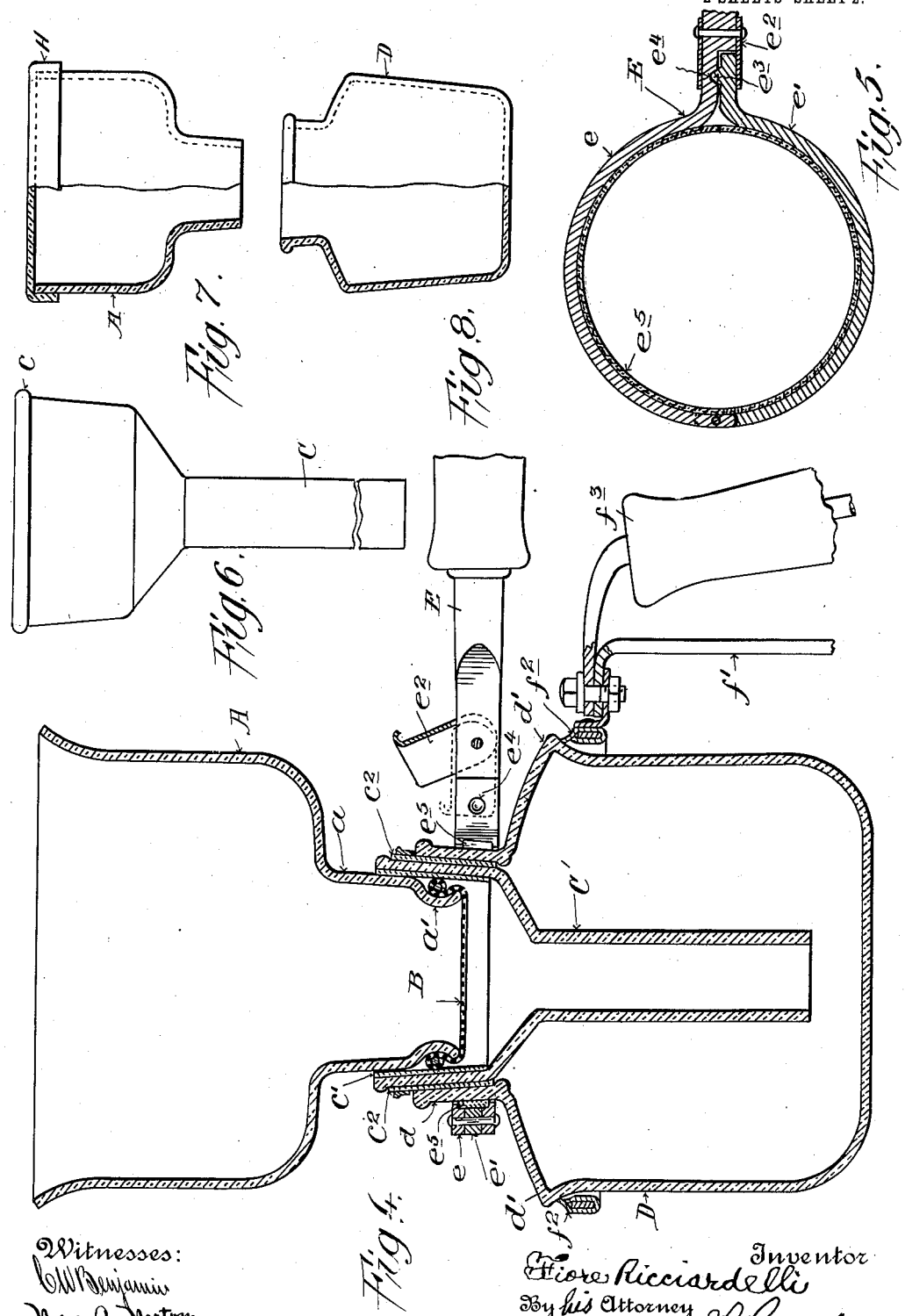

UNITED STATES PATENT OFFICE.

FIORE RICCIARDELLI, OF JERSEY CITY, NEW JERSEY.

PERCOLATOR.

1,121,399. Specification of Letters Patent. Patented Dec. 15, 1914.

Application filed January 17, 1914. Serial No. 812,651.

*To all whom it may concern:*

Be it known that I, FIORE RICCIARDELLI, a citizen of the United States, residing at Jersey City, in the county of Hudson and State of New Jersey, have invented a certain new and useful Improvement in Percolators, of which the following is a specification.

This invention relates to domestic cooking vessels, and more especially to coffee pots; and the object of the same is broadly to produce a percolator wherein the water will not escape whether the kettle be originally filled beyond its normal capacity or whether the water bubble up considerably as it is boiled.

Further objects are also brought out in the following specification.

I will first describe my improvement in detail and then point out the novel features in the claim.

Figure 2:
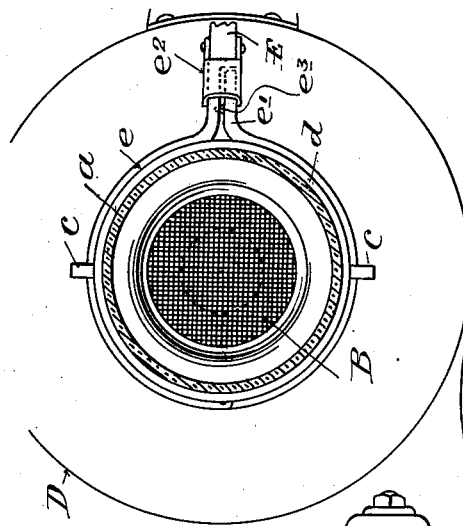
Figure 3:
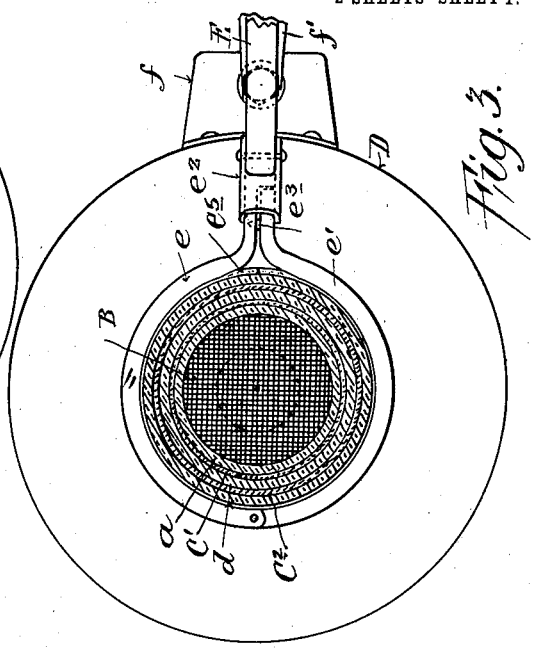
Figure 1:
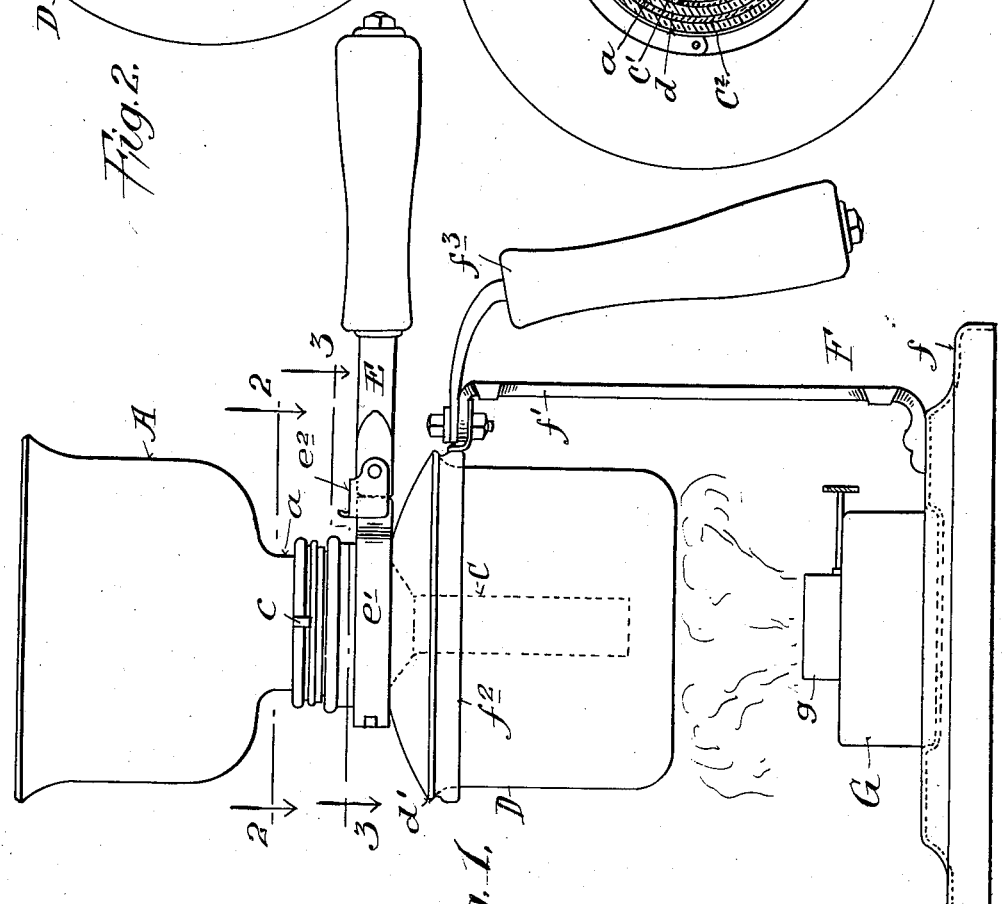

In the accompanying drawings Figure 1 is a side view of a percolator embodying my improvement; Fig. 2 is a sectional view taken through the plane of the dotted line 2—2, Fig. 1; Fig. 3 is a sectional view taken through the plane of the dotted line 3—3, Fig. 1; Fig. 4 is a vertical section of a percolator embodying my improvement; Fig. 5 is a sectional view of a handle which may be used in connection with a percolator embodying my improvement; Fig. 6 is a view showing parts of a percolator embodying my improvement; and Figs. 7 and 8 are partial sectional views of a modified form of percolator embodying my improvement.

Similar letters of reference designate corresponding parts in all the figures.

A designates a receptacle shown as provided with a downwardly tapering extension $a$. In the form illustrated in Figs. 1 to 4 inclusive, the lower end of this extension $a$ is shown as provided with a shoulder $a'$, and there may be tied around this shoulder $a'$ a fabric, as B, suitable for straining or filtering purposes.

C designates a funnel flared at its upper end that the extension $a$ may be fitted into it. The body of the funnel may be provided with flanges or projections as $c$, and a packing as $c'$ of cork or other suitable material may surround the interior to effect a tight jointure between it and the extension $a$.

D designates a receptacle or kettle shown as provided with a flaring neck as $d$. The spout $C'$ of the funnel is appreciably smaller than said neck, and hangs through it into the kettle, and a packing as $c^2$ of cork or other suitable material may surround the exterior of the body of the funnel where it fits into the kettle D so as to effect a tight jointure between the latter and the upper end of the funnel. In the form of percolator illustrated in Figs. 1 to 6, the kettle D is shown as provided with a shoulder $d'$, but this shoulder may be omitted.

E designates a handle. This handle E may have a collar $e$ $e'$ adapted to encircle the neck $d$. In order to readily remove the handle E from the neck $d$ this collar may have a hinged part $e'$, and a clasp $e^2$ may be provided for locking the parts of the handle E together and the whole around the neck $d$. The hinged part $e'$ is shown as provided with a teat $e^3$ adapted to fit into a recess as $e^4$. Inside the collar $e$ $e'$ I may, if desired, provide a packing, as $e^5$ of cork or other suitable material. To place the handle E in position around the neck $d$ the hinged part $e'$ may be thrown aside and then brought around into contact with the neck $d$, and the clasp $e^2$ then pushed downward to lock the hinged part $e'$ to the fixed part $e$ and the whole collar in position.

F designates a stand shown as consisting of a base $f$, an upright $f'$, a ring-shaped holder $f^2$, and a handle $f^3$.

The contents of the kettle D may be heated in any desired manner. In the drawings I have shown a reservoir G for holding alcohol, oil or other desired liquid. This reservoir G is shown as provided with a burner, $g$.

In the form of percolator illustrated in Figs. 7 and 8 the shoulder $a'$ is omitted. The fabric B intended for filtering purposes may be held in place without tying, by merely pressing the extension $a$ into the upper end of the funnel C, allowing sufficient of the fabric to be held between the extension $a$ and that part of the funnel body which surrounds the extension $a$.

In Figs. 1 and 4 the receptacle A is shown as flaring outwardly at its upper end, but the receptacle A may be made of any desired shape, and, if so desired, may be provided with a cover, as H.

In the use of this improved coffee pot, the kettle is filled with water either before or after it is mounted on the stand, and, while it is desirable that the level of the water line shall stand just under the neck $d$, that is not important. The funnel is then dropped into place, with or without the packing $c^2$ between its flaring body and the flaring neck of the kettle, and its spout hangs into the latter and extends nearly to the bottom thereof as shown in Fig. 4. Pulverized coffee or other material is then placed in the receptacle A and will, of course, fall to the lower end thereof and rest on the strainer. The tapering extension $a$ of this receptacle is then inserted into the body of the funnel, with or without the packing $c'$, and the turned up edges of the fabric will be clamped between the shoulders $a'$ and the body of the funnel. It will be observed that the extension projects down for a considerable distance into the funnel, although standing above what should be the normal water line, whereas the body of the funnel extends almost completely through the neck of the kettle, beneath which the size of the body is reduced to that of the spout as shown. The entire device mounted within the ring of the holder is now subjected to heat, as by lighting the fuel at the burner $g$. In time the water within the kettle begins to simmer and finally it boils, in doing so the ebullitions cause it to first throw off steam which rises through the fabric and the material resting upon it, and finally to toss the water through said fabric if the water level is sufficiently high. The boiling of the water around the spout $C'$ generates steam above it which cannot escape, and this steam expands and presses downward on the water so that what water is within the spout is forced upward. Therefore, although the water may be originally placed in the kettle to the desired level, when it boils the water immediately beneath the strainer rises; but although the water is boiling inside and outside of the funnel, none of it will escape from the device, because the body of the funnel fits closely in the neck of the kettle and the extension of the receptacle fits closely in the body of the funnel, packing being preferably interposed between the elements as stated. After the material upon the strainer has been subjected to steam or boiling water for a sufficient length of time, the light is extinguished or turned down so that the coffee may be kept warm ready for serving.

When it is desired to pour out the contents of the kettle D, the receptacle A and the funnel C are removed, and the liquid may be poured from the kettle D, the handle E being used for lifting the kettle bodily out of the ring $f^2$ of the stand F.

All parts of the percolator with which the liquid comes into contact in the process of brewing will be made of suitable non-metallic substance, such, for instance, as glass. If transparent glass be used the brewing process may be viewed.

Instead of using packing between the extension $a$ and the funnel C, or between the upper end of the funnel C and the receptacle D, the portions of the funnel C intended to come into contact with the extension $a$ and with the receptacle D may be so ground as to afford a tight fitting of the parts and prevent the egress of liquid or vapor.

What I claim as my invention and desire to secure by Letters Patent is:

A percolator comprising a stand adapted to contain a source of heat and having a ring above it, a kettle removably mounted in said ring and having a flaring neck at its top, a funnel having a flaring body removably fitting said neck, and contracted below said body and continued downward into a spout hanging normally within the kettle-body, a receptacle having a tapering tubular extension at its lower end adapted to fit within the body of the funnel, a strainer across the lower end of said extension, and a handle having a ring detachably engaging the neck of the kettle.

FIORE RICCIARDELLI.

Witnesses:
J. R. BOWEN,
NORA A. NORTON.